(12) United States Patent
Sethi et al.

(10) Patent No.: US 7,243,338 B2
(45) Date of Patent: Jul. 10, 2007

(54) REPRESENTATION OF CORE FILES IN A GENERIC FORMAT

(75) Inventors: Ajay Sethi, Bangalore (IN); Sameer Shisodia, Bangalore (IN); Mahantesh Hosmath, Dharwad (IN); Ritesh Motlani, Madhya Pradesh (IN); Ramesh Bhattiprolu, Bangalore (IN); Kirk Bradley, San Francisco, CA (US); John Pullokkaran, Foster City, CA (US); Sunil Kumar, Foster City, CA (US); Gopalaswamy Ramesh, Chennai (IN)

(73) Assignee: Oracle International Corporation, Redwood Shores, CA (US)

( * ) Notice: Subject to any disclaimer, the term of this patent is extended or adjusted under 35 U.S.C. 154(b) by 707 days.

(21) Appl. No.: 10/443,311

(22) Filed: May 21, 2003

(65) Prior Publication Data

US 2003/0226134 A1 Dec. 4, 2003

Related U.S. Application Data

(60) Provisional application No. 60/384,206, filed on May 29, 2002.

(51) Int. Cl.
*G06F 9/44* (2006.01)

(52) U.S. Cl. .................................. 717/128; 717/147

(58) Field of Classification Search ................ 717/106, 717/109, 114, 117, 120, 123, 124–128, 146–147
See application file for complete search history.

(56) References Cited

U.S. PATENT DOCUMENTS 5,339,406 A 8/1994 Carney et al.
5,560,009 A 9/1996 Lenkov et al.

(Continued)

OTHER PUBLICATIONS

Oracle, "Oracle9i Database Error Message", ORACLE Corporation, pp. i-xxiv, Chapter1, pp. 1-6, Chapter 50, pp. 1-78, Chapter 51, pp. 1-22, Chapter 52, pp. 1-16, Mar. 2002.*

(Continued)

*Primary Examiner*—Ted T. Vo
(74) *Attorney, Agent, or Firm*—Hickman Palermo Truong & Becker LLP

(57) ABSTRACT

Techniques for representing core files generated by a computer operating system upon crash of a computer program in a generic format are disclosed. A generic representation of the core file can be generated and analyzed to help in determining errors in code that occurred which the operating system is unable to handle. The generic representation of core files can be represented in a platform-independent format, for example, generic representation of core files may be represented in an extensible data format.

33 Claims, 30 Drawing Sheets

U.S. PATENT DOCUMENTS

| | | | |
|---|---|---|---|
| 5,740,444 | A | 4/1998 | Frid-Nielsen |
| 5,854,924 | A | 12/1998 | Rickel et al. |
| 5,999,933 | A | 12/1999 | Mehta |
| 6,151,701 | A | 11/2000 | Humphreys et al. |
| 6,226,786 | B1 | 5/2001 | Hickman et al. |
| 6,681,348 | B1 * | 1/2004 | Vachon ................... 714/45 |
| 2003/0226135 | A1 | 12/2003 | Sethi et al. |

OTHER PUBLICATIONS

Gary Brooks et al., "A New Approach to Debugging Optimized Code," ACM SIGPLAN '92, 1992, pp. 1-11.

R. Bayer et al., "The ALCOR Illinois 7090/7094 Post Mortem Dump," Communications of the ACM, vol. 10, No. 12, Dec. 1967, pp. 804-808.

Mark Scott Johnson, "The Design of a High-Level, Language-Independent Symbolic Debugging System," Department of Computer Science, The University of British Columbia, 1977, pp. 315-322.

David R. Barach et al., "The Symbol Table Representation of Types in the PROPHET System," Bolt Beranek and Newman, Inc., pp. 17-26, Apr. 1981.

John Hennessy, "Symbolic Debugging of Optimized Code," ACM Transactions on Programming Languages and Systems, vol. 4, No. 3, Jul. 1982, pp. 323-344.

Mark Scott Johnson, "Software Debugging Glossary," Hewlett-Packard Company, Sep. 1981, pp. 53-70.

John R. Levine, "Linkers and Loaders," Academic Press, Morgan Kaufmann Publishers, 2000, 7 pages.

* cited by examiner

```
502
 1.  typedef struct {
 2.  /*----------------------------------------------
 3.  Meta meta - basic info about the GCORE file
 4.  ----------------------------------------------*/
 5.      uchar_t     gc_ident[16];  /* same as in ELF */
 6.  /* [0-5] - file identification */
 7.      .
 8.      .
 9.      ub4         gc_sec_flags /* what sections can/not be found   502c
         */
10. /*----------------------------------------------
11. offsets to/sizes of various sections in the section header table are
    known about each section
12. , and may be included in the GCORE – all that is needed is the
    off/size
13. ----------------------------------------------
14. /* Offsets to sizes are "added" as corresponding linked lists are
    flushed out to the GCORE */                              502a
15.     ub4         gc_env_off;   /* offset to .env */        502b
16.     ub4         gc_env_sz     /* size of above */
17.     .
18.     .
19.     ub4         gc_oracle4_off    /* offset to .oracle4 */   502a
20.     ub4         gc_oracle4_sz     /* size of above */        502b
21. } gc_header;
```

1. *Entries to the environment section may come from either user-defined data, or initialization parameters, for example, atinit.ora.*
2. .env
3. /*******************************************/
4. /* This section includes information, such as information about the operating system, the processor, and the compiler */
5. /*******************************************/

1. Entries are added to the files section, .files, from input files,
2. for example exe/core/.h's/.c's/.trc's.
3. .files
4. /*******************************************************/
5. /* info about all the files read to create this GCORE */
6. /* go into the .files section */
7. /*******************************************************/

1. Any strings that are encountered, for example - files, syms, types may be added to the string table section, .strtab.
2. .strtab
3. all symbol, file names - format same as ELF
4. If and when .c's files are parsed – entries are added to the string table section, .strtab

.locsymtab
1. Entries to the local symbol table, .locsymtab are added from
2. the Symbol table .symtab in the executable, and at a later point,
3. entries to the locsymtab may be added during parsing of the
4. header files, .h's.
5.

.symtab
1.
2. Symbol table entries are extracted from the core and as an alternative,
3. entries to the symbol table may also be extrapolated from trace files.

1. syminfo
2. Entries in the symbol info section describe types / information for a symbol as interpreted from its declaration
3.

.stack

1.
2.
3. Stack section .stack entries are extracted from the executable
4. if its been -g compiled – an alternative may be addition of entries
5. dependent on various heuristics to relate the text section to .c's

.lines
1. Entries to the lines section are added from the executable,
2. entries are also added during .h (header file) parsing or the
3. UI command line commands given by the user
4.

1. .types
2. The .types section contains meta information about each basic/user-defined type.
3. Entries are added using information from the exe, (executable) and later during
4. the .h (header file) parsing or UI cmdline commands given by the user.
5. /*************************************************
6.    Meta info about each basic/user defined type
7.    *************************************************/

FIG. 5K

.typesinfo
1. gc_cmplx_type_member
2. gc_cmplx_type_member
3. where :
4. struct gc_cmplx_type_member {          } 524a
5. ub4 gc_cmem_name;   /* offset into strtab */
6. ub4 gc_type_offs;   /* offset into .types for type of member */
7. }                   /* offset pair describing the param/element */ } 524b
8. typedef struct gc_cmplx_type_member gc_cmplx_type_member;

1. .rodatamt
2. All of the read-only (.rodata*) sections are copied from the original executable
3. from the read-only .rodata segments in the core without modification and a
4. master table is maintained.
5. struct gc_rodatamt {
6.     ub4 start_vaddr;/* start of range of vaddrs in this .rodata section */
7.     ub4 end_vaddr;    /* end of range */
8.     ub4 offset; /* of the corresp .rodata section */
9. }
10. typedef struct gc_rodatamt gc_rodatamt;
11. .datamt
12. All of the data .data* sections are copied from the original executable without
13. modification and from data segments in the corea master table is created
14. and maintained (all the rodata/data sections may be copied contiguously)
15. struct gc_datamt {
16.     ub4 start_vaddr; /* start of range of vaddrs in this .data section */
17.     ub4 end_vaddr;    /* end of range */
18.     ub4 offset; /* of the corresp .data section */
19. }
20. typedef struct gc_datamt gc_datamt;

1. .textmt
2. All of the .text sections are copied from the original executable without
3. modification and from the text segments in the core. A master table
4. is maintained of
5. struct gc_textmt {
6.     ub4 start_vaddr;/* start of range of vaddrs in this .text section */  } 528a
7.     ub4 end_vaddr;      /* end of range */
8.     ub4 offset; /* of the corresp .text section */  528b
9. }
10. typedef struct gc_textmt gc_textmt;

```
1 <?xml version="1.0"?>
2 <xsd:schema xmlns:xs="http://www.w3.org/2001/XMLSchema"

3 <xsd:complextype name="HeaderType">

4 <xsd:annotation>
5 <xsd:documentation>
6 Complex Type defined for header.
7 </xsd:documentation>
8 </xsd:annotation>

9 <xsd:all>
10   <xsd:element name="GCORE_ident"      type ="xsd:string">
11   <xsd:element name="GCORE_version"    type ="xsd:string">
12   <xsd:element name="GCORE_entry_point" type ="xsd:string">
13   <xsd:element name="GCORE_section_flag" type ="xsd:string">
14   <xsd:element name="GCORE_env_off"    type ="xsd:positiveInteger">
15   <xsd:attribute name="GCORE_env_sz" type="xsd:positiveInteger" use="required"/>
16   <xsd:element name="GCORE_stack_off"  type ="xsd:positiveInteger">
17   <xsd:attribute name="GCORE_stack_sz" type="xsd:positiveInteger" use="required"/>
18   <xsd:element name="GCORE_locsymt_off" type ="xsd:positiveInteger">
19   <xsd:attribute name="GCORE_locsymt_sz" type="xsd:positiveInteger" use="required"/>
20   <xsd:element name="GCORE_symt_off"   type ="xsd:positiveInteger">
21   <xsd:attribute name="GCORE_symt_sz" type="xsd:positiveInteger" use="required"/>
22   <xsd:element name="GCORE_strt_off"   type ="xsd:positiveInteger">
23   <xsd:attribute name="GCORE_strt_sz" type="xsd:positiveInteger" use="required"/>
24   <xsd:element name="GCORE_typesinfo_off" type ="xsd:positiveInteger">
25   <xsd:attribute name="GCORE_typesinfo_sz" type="xsd:positiveInteger" use="required"/>
26   <xsd:element name="GCORE_type_off"   type ="xsd:positiveInteger">
27   <xsd:attribute name="GCORE_type_sz" type="xsd:positiveInteger" use="required"/>
28   <xsd:element name="GCORE_line_off"   type ="xsd:positiveInteger">
29   <xsd:attribute name="GCORE_line_sz" type="xsd:positiveInteger" use="required"/>
30   <xsd:element name="GCORE_file_off"   type ="xsd:positiveInteger">
31   <xsd:attribute name="GCORE_file_sz" type="xsd:positiveInteger" use="required"/>
32   <xsd:element name="GCORE_dbg_off"    type ="xsd:positiveInteger">
33   <xsd:attribute name="GCORE_dbg_sz" type="xsd:positiveInteger" use="required"/>
34   <xsd:element name="GCORE_textmt_off" type ="xsd:positiveInteger">
35   <xsd:attribute name="GCORE_textmt_sz" type="xsd:positiveInteger" use="required"/>
36   <xsd:element name="GCORE_datamt_off" type ="xsd:positiveInteger">
37   <xsd:attribute name="GCORE_datamt_sz" type="xsd:positiveInteger" use="required"/>
38   <xsd:element name="GCORE_rodata_off" type ="xsd:positiveInteger">
39   <xsd:attribute name="GCORE_rodata_sz" type="xsd:positiveInteger" use="required"/>
40   <xsd:element name="GCORE_oratrc_off" type ="xsd:positiveInteger">
41   <xsd:attribute name="GCORE_oratrc_sz" type="xsd:positiveInteger" use="required"/>
```

```
42  <xsd:element name="GCORE_oracle1_off"   type ="xsd:positiveInteger">
43  <xsd:attribute name="GCORE_oracle1_sz" type="xsd:positiveInteger" use="required"/>
44  <xsd:element name="GCORE_oracle2_off"   type ="xsd:positiveInteger">
45  <xsd:attribute name="GCORE_oracle2_sz" type="xsd:positiveInteger" use="required"/>
46  <xsd:element name="GCORE_oracle3_off"   type ="xsd:positiveInteger">
47  <xsd:attribute name="GCORE_oracle3_sz" type="xsd:positiveInteger" use="required"/>
48  <xsd:element name="GCORE_oracle4_off"   type ="xsd:positiveInteger">
49  <xsd:attribute name="GCORE_oracle4_sz" type="xsd:positiveInteger" use="required"/>
50  <xsd:any minOccurs="0" maxOccurs="unbounded"/>
51  </xsd:all>
52  <xsd:anyAttribute/>
53  </xsd:complextype>
```

```
1   <xsd:complextype name="envInfoType">
2     <xsd:annotation>
3      <xsd:documentation>
4        Complex Type defined for environment Information.
5      </xsd:documentation>
6     </xsd:annotation>

7     <xsd:sequence>
8        <xsd:element name="env_processor"    type ="xsd:string">
9        <xsd:element name="env_os"    type ="xsd:string">
10       <xsd:element name="env_str_index"   type ="xsd:positiveInteger">
11       <xsd:element name="env_compiler_flag"  type ="xsd:string">
12       <xsd:element name="env_exe_version"  type ="xsd:string">
13       <xsd:any minOccurs="0" maxOccurs="unbounded"/>
14    </xsd:sequence>
15    <xsd:anyAttribute/>
16  </xsd:complextype>
```

```
1   <xsd:complextype name="fileInfoType">
2    <xsd:annotation>
3     <xsd:documentation>
4     Complex Type defined for file Information.
5     </xsd:documentation>
6    </xsd:annotation>

7    <xsd:sequence>
8     <xsd:element name="file_name"    type ="xsd:string">
9     <xsd:element name="file_type"    type ="xsd:string">
10    <xsd:element name="file_tstamp"   type ="xsd:string">
11    <xsd:element name="file_other_info"   type ="xsd:string">
12   </xsd:sequence>
13   <xsd:anyAttribute/>
14   </xsd:complextype>
```

```
1   <xsd:complextype name="symtableType">
2     <xsd:annotation>
3       <xsd:documentation>
4         Complex Type defined for symbol table.
5       </xsd:documentation>
6     </xsd:annotation>

7   <xsd:sequence>
8     <xsd:element name="symt_name"   type ="xsd:string"
                    minoccurs="0" maxoccurs="unbounded">
9     <xsd:element name="symt_value"  type ="xsd:positiveInteger"
                    minoccurs="0" maxoccurs="unbounded">
10    <xsd:element name="symt_offset" type ="xsd:positiveInteger"
                    minoccurs="0" maxoccurs="unbounded">
11    <xsd:element name="symt_type"   type ="xsd:positiveInteger"
                    minoccurs="0" maxoccurs="unbounded">
12    <xsd:element name="symt_desc"   type ="xsd:string"
                    minoccurs="0" maxoccurs="unbounded">
13    <xsd:any minOccurs="0" maxOccurs="unbounded"/>
14  </xsd:sequence>
15  <xsd:attribute name="symt_type" type="symtype" use="required"/>
16  <xsd:anyAttribute/>
17  </xsd:complextype>
```

```
1   <xsd:complextype name="symInfoType">
2     <xsd:annotation>
3       <xsd:documentation>
4         Complex Type defined for symbol information.
5       </xsd:documentation>
6     </xsd:annotation>

7   <xsd:sequence>
8     <xsd:element name="syminfo_indx"   type ="xsd:positiveInteger"
                   minoccurs="0"  maxoccurs="unbounded">
9     <xsd:element name="syminfo_flags"   type ="xsd:string"
                   minoccurs="0"  maxoccurs="unbounded">
10    <xsd:any minOccurs="0" maxOccurs="unbounded"/>
11  </xsd:sequence>
12  <xsd:anyAttribute/>
13 </xsd:complextype>
```

```
1   <<xsd:complextype name="stackType">
2     <xsd:annotation>
3     <xsd:documentation>
4       Complex Type defined for stack.
5     </xsd:documentation>
6     </xsd:annotation>

7   <xsd:sequence>
8     <xsd:element name="stack_frame_no" type="xsd:positiveInteger"
                   minoccurs="0" maxoccurs="unbounded">
9     <xsd:element name="stack_frame_name" type="xsd:string"
                   minoccurs="0" maxoccurs="unbounded">
10    <xsd:element name="stack_parameter_no" type="xsd:positiveInteger"
                   minoccurs="0" maxoccurs="unbounded">
11    <xsd:element name="stack_localvar_no" type="xsd:positiveInteger"
                   minoccurs="0" maxoccurs="unbounded">
12    <xsd:element name="stack_frame_no" type="xsd:positiveInteger"
                   minoccurs="0" maxoccurs="unbounded">
13    <xsd:element name="stack_frame_addr" type="xsd:positiveInteger"
                   minoccurs="0" maxoccurs="unbounded">
14    <xsd:element name="stack_pointer" type="xsd:positiveInteger"
                   minoccurs="0" maxoccurs="unbounded">
15    <xsd:element name="stack_frame_pointer" type="xsd:positiveInteger"
                   minoccurs="0" maxoccurs="unbounded">
16    <xsd:element name="stack_parameter_list_offset" type="xsd:positiveInteger"
                   minoccurs="0" maxoccurs="unbounded">
17    <xsd:element name="stack_variable_list_offset" type="xsd:positiveInteger"
                   minoccurs="0" maxoccurs="unbounded">
18    <xsd:element name="stack_retaddr" type="xsd:positiveInteger"
                   minoccurs="0" maxoccurs="unbounded">
19    <xsd:element name="stack_retval" type="xsd:positiveInteger"
                   minoccurs="0" maxoccurs="unbounded">
20    <xsd:element name="stack_pstack" type="xsd:positiveInteger"
                   minoccurs="0" maxoccurs="unbounded">
21    <xsd:element name="stack_frame_no" type="xsd:positiveInteger"
                   minoccurs="0" maxoccurs="unbounded">
22    <xsd:element name="stack_os" type="xsd:positiveInteger"
                   minoccurs="0" maxoccurs="unbounded">
23    <xsd:attribute name="symt_type" type="xsd:string" use="required"/>
24    <xsd:any minOccurs="0" maxOccurs="unbounded"/>
25   </xsd:sequence>
26  <xsd:anyAttribute/>
27  </xsd:complextype>
```

```
1   <xsd:complextype name="lineType">
2   <xsd:annotation>
3   <xsd:documentation>
4   Complex Type defined for line.
5   </xsd: documentation>
6   </xsd:annotation>

7   <xsd:sequence>
8   <xsd:element name="line_flag" type="xsd:string"
                    minoccurs="0" maxoccurs="unbounded">
9   <xsd:element name="line_file_offset" type="xsd:positiveInteger"
                    minoccurs="0" maxoccurs="unbounded">
10  <xsd:element name="line_naddr" type="name_addr"
                    minoccurs="0" maxoccurs="unbounded">
11  <xsd:element name="line_num" type="xsd:positiveInteger"
                    minoccurs="0" maxoccurs="unbounded">
12  <xsd:any minOccurs="0" maxOccurs="unbounded"/>
13  </xsd:sequence>
14  <xsd:anyAttribute/>
15  </xsd:complextype>

16  <xsd:complextype name="name_addr">
17  <choice>
18  <xsd:element name="name" type="xsd:string">
19  <xsd:element name="address" type="xsd:positiveInteger">
20  </choice>
21  <xsd:anyAttribute/>
22  </xsd:complextype>
```

```
1   <xsd:complextype name="type">
2   <xsd:annotation>
3   <xsd:documentation>
4   Complex Type defined for type.
5   </xsd:documentation>
6   </xsd:annotation>

7   <xsd:sequence>
8   <xsd:element name="type_name" type="xsd:string"
                    minoccurs="0" maxoccurs="unbounded">
9   <xsd:element name="type_size" type="xsd:positiveInteger"
                    minoccurs="0" maxoccurs="unbounded">
10  <xsd:element name="type_aligninfo" type="xsd:string"
                    minoccurs="0" maxoccurs="unbounded">
11  <xsd:element name="type_flags" type="xsd:string"
                    minoccurs="0" maxoccurs="unbounded">
12  /* New type can be formed*/
13  <xsd:element name="type_member_no" type="xsd:positiveInteger"
                    minoccurs="0" maxoccurs="unbounded">
14  <xsd:element name="type_member_offset" type="xsd:positiveInteger"
                    minoccurs="0" maxoccurs="unbounded">
15  <xsd:any minOccurs="0" maxOccurs="unbounded"/>
16  </xsd:sequence>
17  <xsd:anyAttribute/>
18  </xsd:complextype>
```

```
1   <xsd:complextype name="sectionType">
2   <xsd:annotation>
3   <xsd:documentation>
4   Complex Type defined for section for text and data .
5   </xsd:documentation>
6   </xsd:annotation>

7   <xsd:sequence>
8   <xsd:element name="section_svaddr" type="xsd:positiveInteger"
                minoccurs="0" maxoccurs="unbounded">
9   <xsd:element name="section_evaddr" type="xsd:positiveInteger"
                minoccurs="0" maxoccurs="unbounded">
10  <xsd:element name="section_offset" type="xsd:positiveInteger"
                minoccurs="0" maxoccurs="unbounded">
11  <xsd:any minOccurs="0" maxOccurs="unbounded"/>
12  </xsd:sequence>
13  <xsd:attribute name="section_type" type="xsd:string" use="required"/>
14  <xsd:anyAttribute/>
15  </xsd:complextype>

16  </xsd:schema>
```

```
1   <?xml version="1.0"?>
2   <xsd:schema xmlns:xs="http://www.w3.org/2001/XMLSchema"
3   <xsd:include schemaLocation="GCOREType.xsd"/>
4   <xsd:element name="GCORE">

5   <xsd:annotation>
6    <xsd:documentation>
7      GCORE file defined with above-defined types.
8    </xsd:documentation>
9   </xsd:annotation>

10  <xsd:complextype>
11   <xsd:sequence>
12     <xsd:element   name="GCORE_header"    type="HeaderType">
13     <xsd:element   name="GCORE_envInfo"   type="envInfoType">
14     <xsd:element   name="GCORE_fileInfo"  type="fileInfoType">
15     <xsd:element   name="GCORE_symt"      type="symtableType">
16     <xsd:element   name="GCORE_syminfo"   type="symInfoType">
17     <xsd:element   name="GCORE_stack"     type="stackType">
18     <xsd:element   name="GCORE_line"      type="lineType">
19     <xsd:element   name="GCORE_type"      type="type">
20     <xsd:element   name="GCORE_typeoffsets" type="xsd:positiveInteger"
21  minoccurs="0" maxoccurs="unbounded">
22     <xsd:element   name="GCORE_section"   type="sectionType">
23   </xsd:sequence>
24  </xsd:complextype>
25  </xsd:element>
26  </xsd:schema>
```

FIG. 5Y

REPRESENTATION OF CORE FILES IN A GENERIC FORMAT

PRIORITY CLAIM AND RELATED APPLICATION

This application claims domestic priority from prior U.S. provisional application Ser. No. 60/384,206, entitled "Platform Independent Core Dump Analysis," filed May 29, 2002, naming as inventor Ajay Sethi, the entire disclosure of which is hereby incorporated by reference for all purposes as if fully set forth herein. This application is related to U.S. non-provisional application Ser. No. 10/443,316, entitled "Optimized Program Analysis," filed May 21, 2003, naming as inventors Ajay Sethi, Sameer Shisodia, Mahantesh Hosmath, Ritesh Motlani, Ramesh Bhattiprolu, Kirk Bradley, John Pullokkaran, Sunil Kumar, and Gopalaswamy Ramesh, the entire disclosure of which is hereby incorporated by reference for all purposes as if fully set forth herein.

FIELD OF THE INVENTION

The present invention generally relates to computer software, and specifically, to computerized software debugging techniques.

BACKGROUND OF THE INVENTION

Unless otherwise indicated, the approaches described in this section are not prior art to the claims in this application and are not admitted to be prior art by inclusion in this section.

When developing program code for multiple computer operating systems, the program code is generic except for specific layers performing platform-dependent tasks. Generic program code should compile and run on all platforms. A core file is typically generated by the operating system when a process fails because of an irrecoverable error. Information obtained from this core file serves as a starting point for determining and analyzing what contributed to the failure.

Commercially available software programs are often shipped in an optimized format, without symbol and type information. In conventional debugging and analysis techniques, lack of this information can necessitate running a process multiple times. Rebuilding unoptimized code is extremely inefficient for software programs with a large source base. When it is not readily apparent how much of the code needs rebuilding, it is impractical to rebuild the code in its entirety because of the size of the resulting binary.

To circumvent this limitation, engineers manually inspect the optimized program code, trying to pinpoint areas that could have contributed to the error. Engineers will typically rebuild the suspect portion of the code unoptimized, run it in the same environment where the error occurred, and attempt to replicate the error. Time and inaccuracy are major drawbacks to this conventional debugging and analysis technique. In addition, the unoptimized code may not behave consistently with the optimized code because the behavior of the executable may be different, and therefore, the error may not be reproducible.

Support and development teams typically perform debugging in tandem. Platforms at client, development, and support sites may well vary, and core file formats vary from platform to platform. Additionally, byte ordering of data differs depending on machine architecture. There are many limitations to conventional debugging and analysis techniques.

For example, in most collaborative support and development environments, support teams are the first to receive and analyze core files generated by a software crash at a client site. Generally, development and support work together to assess, troubleshoot and resolve code errors. One benefit of collaborative environments is that individuals are able to contribute to areas of the code in which they have expertise. However, a drawback to traditional techniques is that collaborative environments often include multiple platforms, operating system versions, and environments. Traditional techniques can require support and development personnel to repeat steps in their separate environments. Both time and effort would be saved if developers and support analysts were able to contribute to editing and building code without duplicating effort. Incremental and persistent capture and storage of analysis and debugging data would save additional time and effort.

In addition, when platforms at client and development sites are different, replicating bugs may be difficult or even impossible. Conventional debuggers require a compiled binary for each platform. A drawback to traditional techniques is that even with platform-specific layers, there may be bugs on a specific platform that will not replicate on another platform. Traditional techniques require that the developer would have to replicate, change, test, and debug the code on both deployment and development environments. This approach requires that the developer be familiar with tools, debuggers and other support software on both platforms. If the developer could analyze the code in a generic format on any platform, time and effort would be saved.

It is therefore desirable to provide techniques for generating and representing core files in a generic format and performing analysis on existing core dumps from optimized binaries. Performing analysis on existing core dumps from optimized binaries eliminates replication of effort using optimized and unoptimized formats. Generating and representing core files in a generic format would remove platform dependence from the debugging process.

SUMMARY OF THE INVENTION

Representation of core files in a generic format can assist analysts in determining code errors. The present invention includes techniques for text-based representation of core files in a generic format facilitating analysis of the files regardless of operating system version or platform and regardless of machine architecture. Techniques are also provided for representation of core files in a flat file data format and in an extensible data format.

Other objects and advantages will become readily apparent from the following detailed description. The invention can be embodied in different ways and its details varied without departing from the invention. Accordingly, the drawing and description are to be regarded as illustrative in nature, and not as restrictive.

BRIEF DESCRIPTION OF THE DRAWINGS

The present invention is depicted by way of example, and not by way of limitation, in the figures of the accompanying drawings and in which like reference numerals refer to similar elements and in which:

FIGS. 5B-5N depict description and program code examples corresponding to FIG. 5A according to an embodiment, FIGS. 5O-5Y depict description and program code examples corresponding to FIG. 5A according to an embodiment; and, FIG. 6 is a block diagram that depicts a computer system upon which embodiments may be implemented.

DETAILED DESCRIPTION OF THE PREFERRED EMBODIMENTS

A method and apparatus for representation of generic core files is herein described. Specific details are set forth to provide a thorough understanding of the present invention. It will be apparent, however, that the present invention may be practiced without these details. In other instances, well-known structures and devices are depicted in block diagram format to avoid unnecessarily obscuring the present invention.

GCORE: The Generic Core

A generic representation of core files and executables, or GCORE as it is henceforth referenced, contains information about core files and executables. According to an embodiment, GCORE includes a superset of binary formats used within UNIX. Examples include: the Executable and Linking Format (ELF), the Common Object File Format (COFF), the Programmable Instruction Set Computers Format (PRISC), and the Mobilization Stationing, Planning, and Execution System Format (MSPES). This superset of binary formats can be extended to support a multitude of binary formats. Since GCORE captures different segments across a multitude of binary formats, GCORE overcomes the debugging requirement of having a compiled binary for each platform. The code base for GCORE is generic therefore analysis can be performed on any platform. Analysis of the GCORE should be done according to the techniques described in patent application 10/443,316, entitled "Optimized Program Analysis" filed on May 21, 2003.

Figure 1:
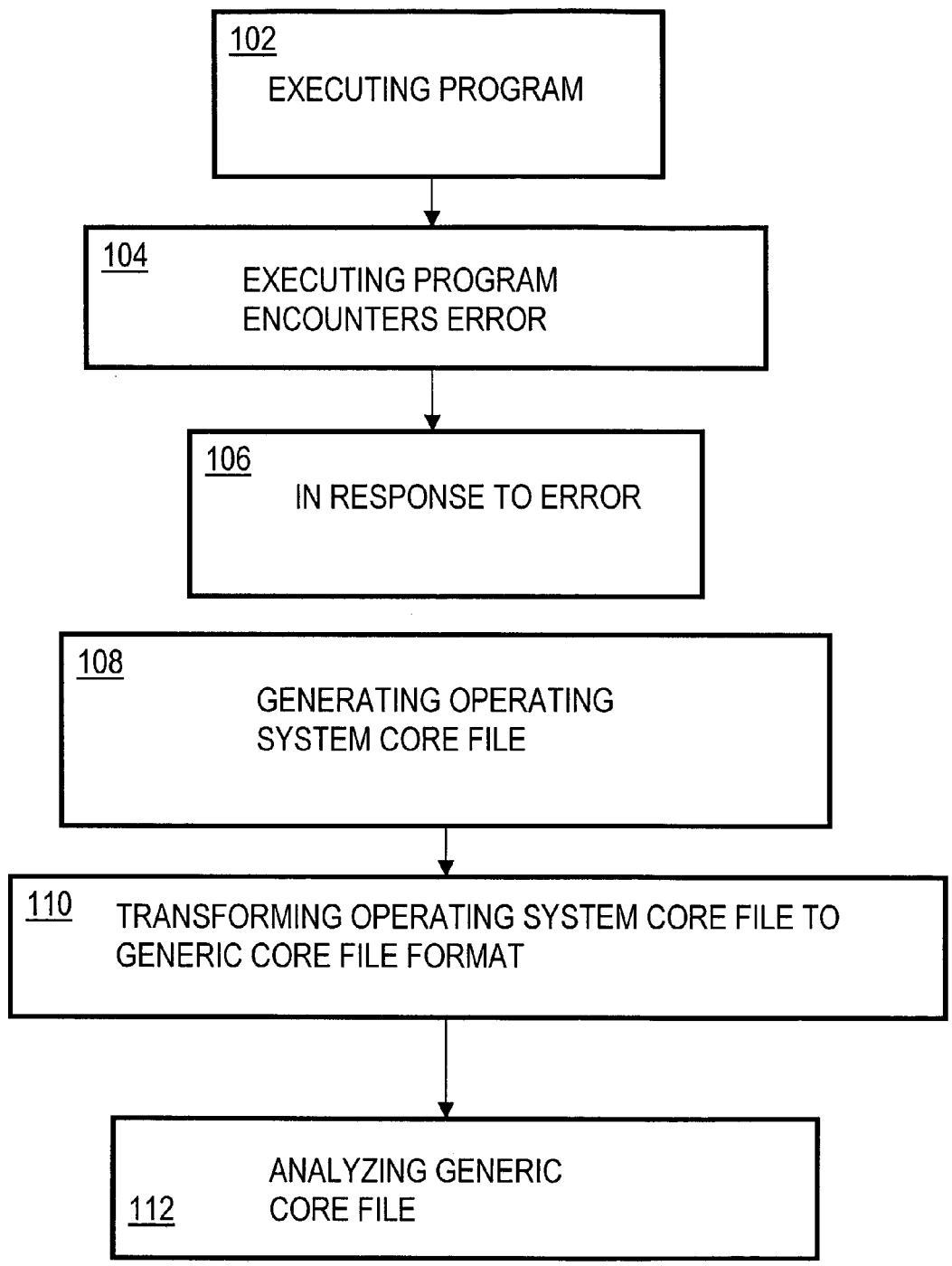
FIG. 1 is a high level flow chart illustrating process steps of generating a generic representation of core files according to an embodiment.

FIG. 1 is a diagram depicting process steps involved in the generation of GCORE, according to an embodiment of the present invention. At process step 102 an executable program on an operating system is invoked, and at process step 104, the executing program encounters an error. In response to the error, at process step 106, the operating system generates an operating system specific core file 108. The operating system specific core file 108 is transformed to a generic core file format 110, and at process step 112, the generic core file can be read and analyzed.

Figure 2:
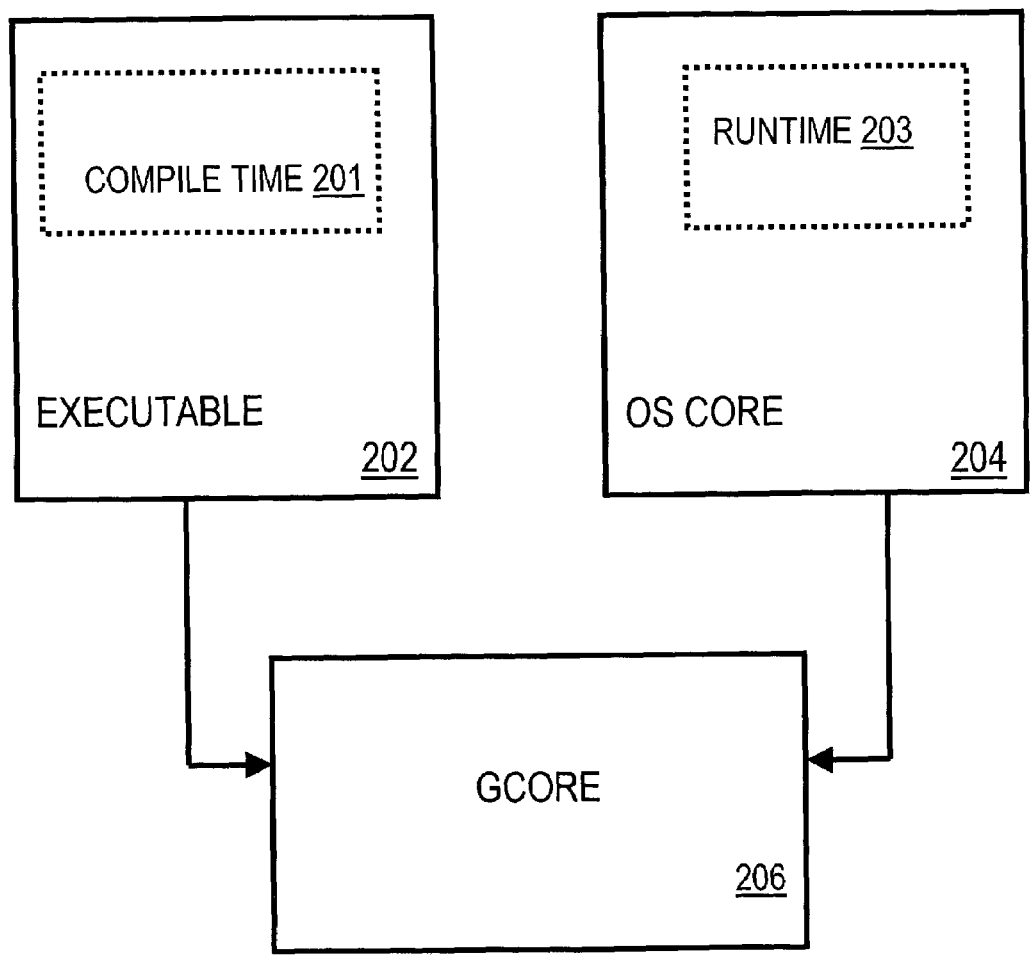
FIG. 2 is a diagram depicting an example of a system for generic representation of core files according to an embodiment.

FIG. 2 is a diagram depicting a system for generic representation of core files according to an embodiment of the present invention. GCORE 206 combines compile time information 201 from executable 202 and run time information 203 from operating system core file 204.

Figure 3:
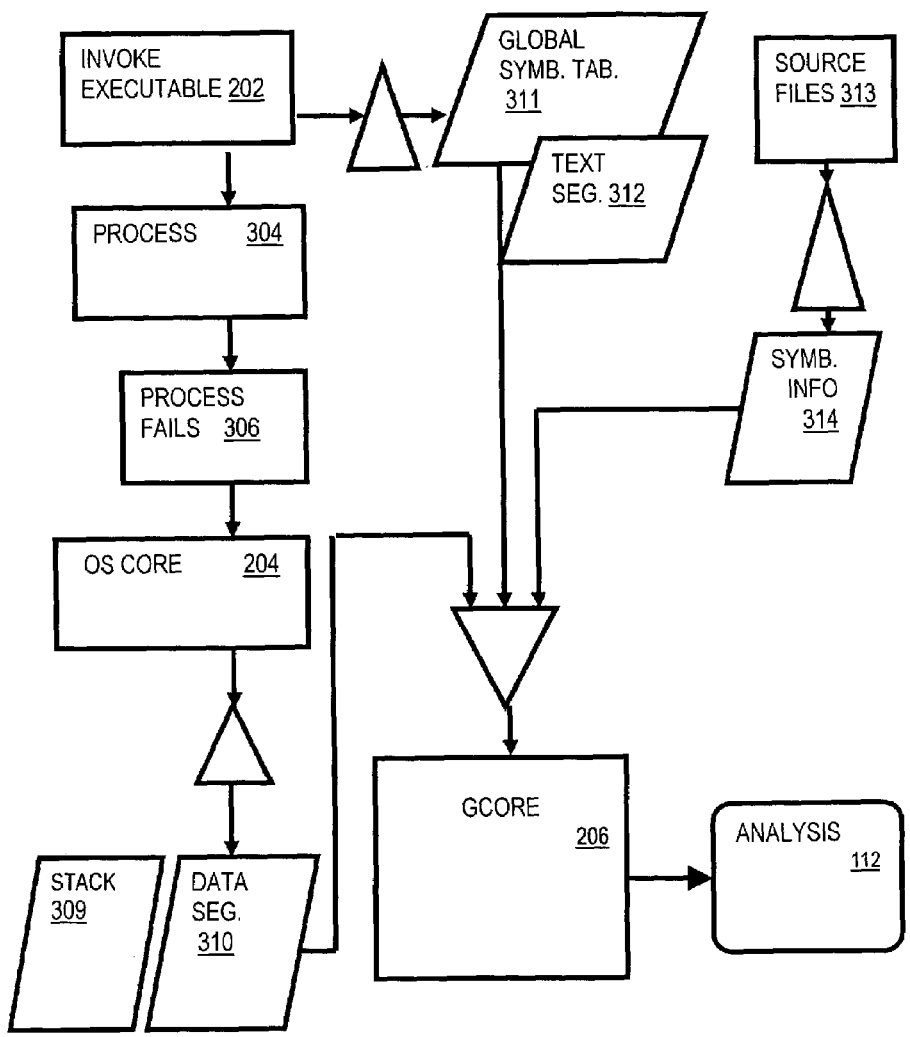
FIG. 3 is a flow chart illustrating an example of process steps for generating a generic representation of core files according to an embodiment.

FIG. 3 depicts process steps involved in the generation of GCORE 206 according to an embodiment of the present invention. Computer system 300 invokes executable 202, and in response, computer system 300 creates a process 304 in memory. When process 304 fails, the operating system 306 creates an operating system core file 204. The operating system core file 204 is a snapshot of the invoked process 304 at the time of failure.

In FIG. 3, consistent with system components of FIG. 2, runtime information 203 such as stack 309 and data segment 310 are extracted from the operating system core file 204. Compile time data, 201, such as global symbol table 311, and text segment machine level instruction 312, are extracted from the executable 202 and symbol information 314 is extracted from source files 313. Entries for corresponding symbols in the global symbol table 311 in the executable 202 are matched against corresponding parameter information in the stack entries 309 from the operating system core file 204. The following are combined to generate GCORE 206: symbol type information 314 drawn from source files 313, text segments (machine-readable data) 312, global symbol table information 311 drawn from executable 202, data segments 310, and stack 309 drawn from the operating system core file 204. Analysis 112 of GCORE 206 should be done according to the techniques described in patent application 10/443,316, entitled "Optimized Program Analysis" filed on May 21, 2003.

AN OPERATIONAL EXAMPLE OF GCORE GENERATION

Figure 4:
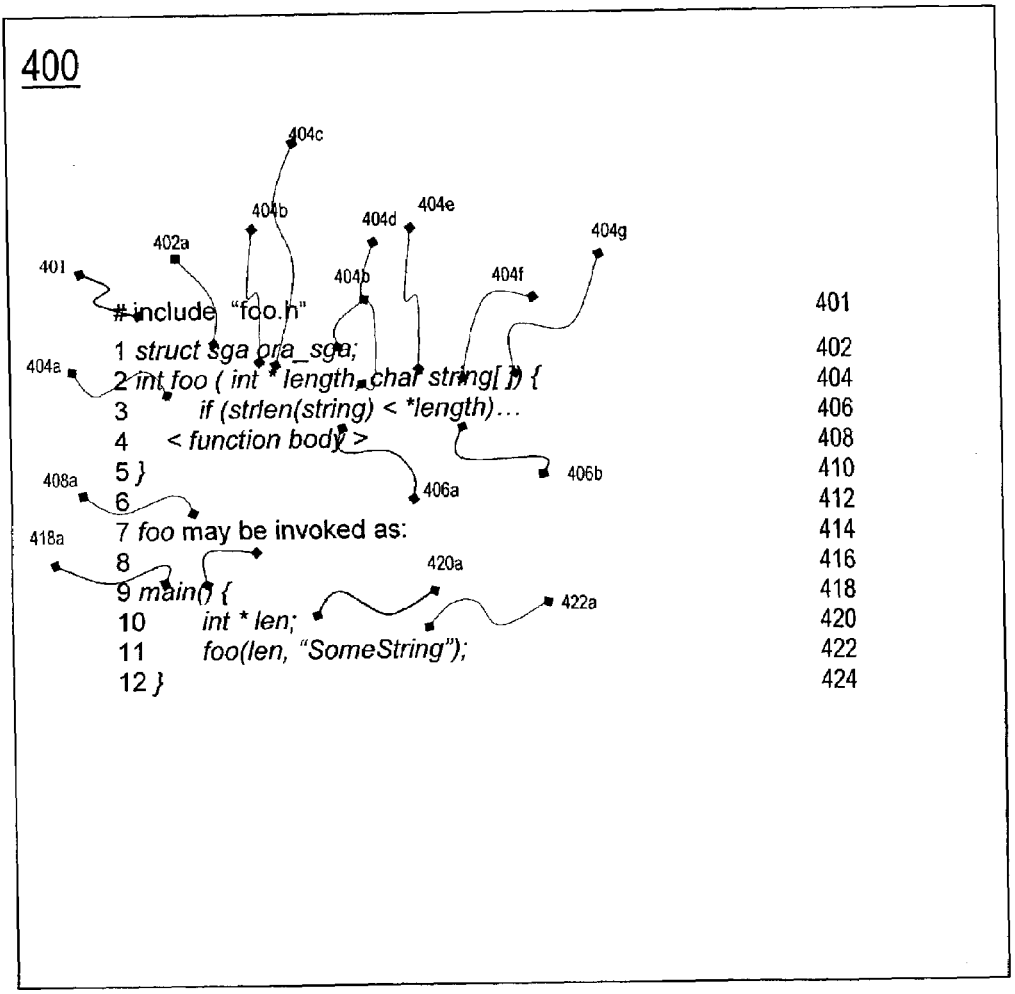
FIG. 4 is a diagram depicting program code which provides details of process steps for generating a generic representation of core files according to an embodiment.

Although it may be apparent to those skilled in the art, for the purposes of clarity, the following operational example of GCORE generation is provided. FIG. 4 is a diagram depicting program code, foo.c, which provides further detail of the process steps for GCORE generation according to the steps as previously described in FIGS. 2 and 3. At instructions 404 Function foo takes in two parameters, length 404d and string 404f, and returns an integer 404a. Inside the function body 408a for foo, length 404d is a pointer to an integer 404b, which references data value for length 406b. In the invocation shown, at instructions 414-424, a pointer len 420a is declared.

At compilation of foo.c, an executable program is generated. At instruction 414 the first function call, main 418a, invokes foo( ) 418b. At instructions 414-424 foo( ) tries to access the address space for the parameters. However, pointer len 420a has not been assigned any address. As shown at instruction 422, len 420a is not initialized because len 420a has not been assigned any address. Because len 420a is not initialized, a segmentation violation occurs. The operating system cannot handle the segmentation violation, producing an operating system core file 204. A global symbol table and text segment exist in the executable program. In this example, symbol foo has a type function, and foo should return an integer, int 404a. Variable ora_sga 402b is a global symbol of type struct sga 402a. Function foo has parameters length 404d and string 404f. Length 404d is of type pointer 404c to integer 404b, string 404f is of type array of characters 404e. The function body 408a is the text of the program. The function body forms the text segment of the executable, and the function body exists as machine level instructions.

The value of each parameter can be determined from the stack based upon the type information. The operating system core file has a stack entry. The stack 309 contains a reference to the function call main 418a. In the example of foo, length 404d is NULL and the string 404f is SomeString 422a. During debugging, while examining the operating system core file 204, if the information that length 404d is null existed at the time of execution it could be easily determined that len was not initialized at instruction 422, and therefore caused a segmentation violation. In optimized executables references to the symbols exist, but symbol and type information is missing or inaccessible; therefore, the values of the parameters are inaccessible. Parameters length 404d and string 404f exist for foo; however, corresponding parameter values cannot readily be determined.

An entry for the global symbol ora_sga 402b exists in the executable after compilation. The entry for global symbol ora_sga 402b has a corresponding address which points to the ora_sga data segments in the operating system core file. The operating system core file contains data segments which contain addresses corresponding to the values of all global symbols. What is missing to interpret and analyze the operating system core file is parameter and symbol type information, such as ora_sga 402b is of type struct sga 402a, and symbol ora_sga 404f is of type string.

At parsing it can be extrapolated that foo has two parameters, a pointer to integer length 406b and array of characters string 406a. Based upon type and members information, corresponding values of the parameter information can be determined from the address information in the operating system core file 204. For example, four bytes correspond to an integer, and one byte corresponds to a character. Parameter information and the fact that foo returns int at instruction 404 is captured in a global symbol table 311 in the executable 202. The structure struct sga 402a is defined in the header 401 of the program file 400, foo.c. The members of the structure can be determined from the definition of structure struct sga. To reconstruct symbol information that was stripped during optimization, the symbol type information can be determined from the declaration of the structure at instructions 402-406 struct sga 402a ora_sga 402b.

GCORE

Figure 5A:
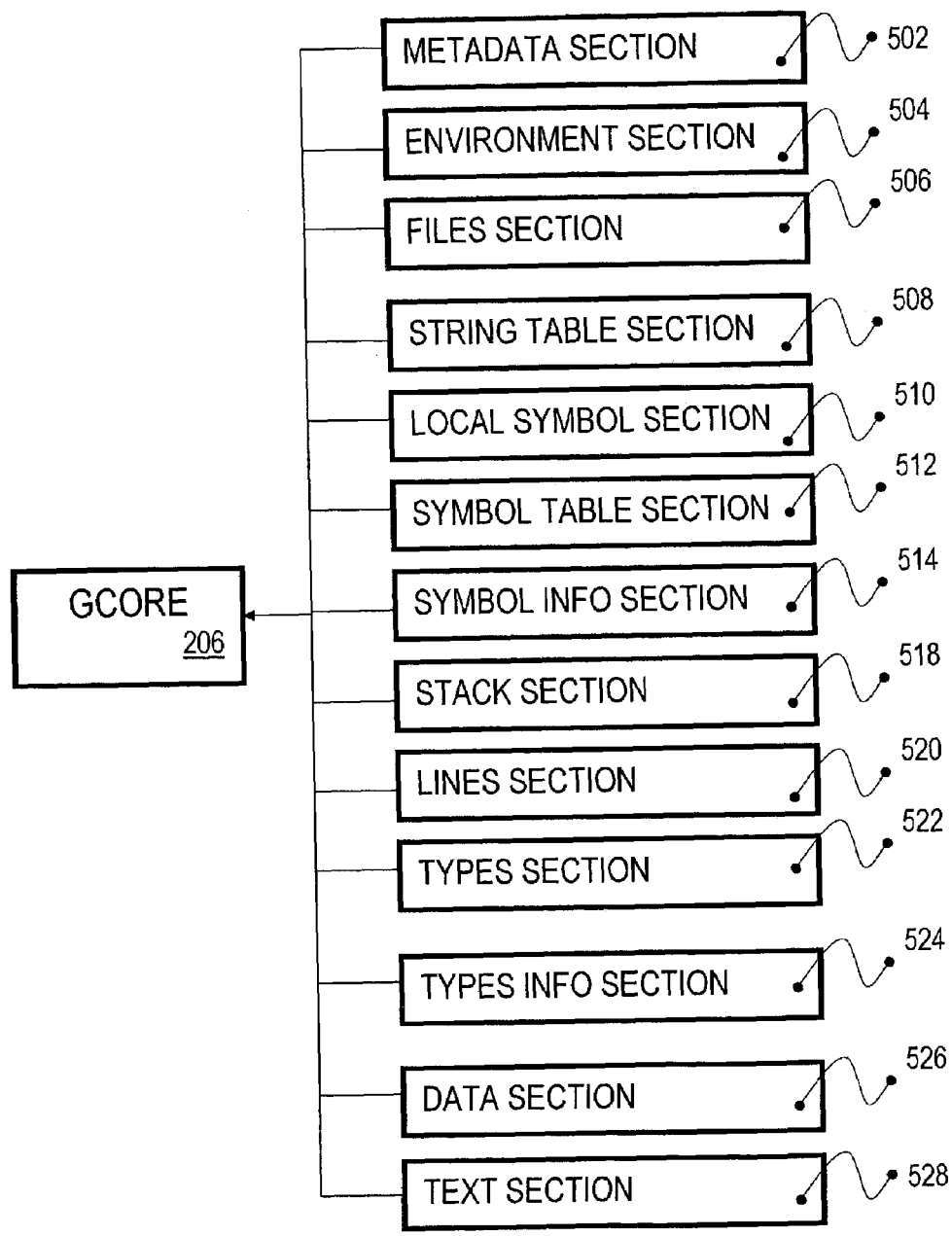
FIG. 5A is a block diagram depicting example section components of a generic representation of core files according to an embodiment.

FIG. 5A is a block diagram depicting section components which define GCORE. According to an embodiment, GCORE is defined using C structures. According to an alternative embodiment, an XML schema describes the format which defines GCORE. Examples of both the C-structure and XML schema definitions of GCORE are included herewith.

GCORE: Defined Using C Constructs

According to an embodiment, GCORE can be defined using C structures. FIGS. 5B-5N provide examples of C structures corresponding to each section of GCORE depicted in FIG. 5A.

MetaData Section

In FIG. 5B, MetaData Section 502 entries provide information about the operating system platform. As depicted in FIG. 502c, an operating system core file is generated and converted into GCORE 206. The MetaData Section 502 also describes the offsets of each section 502a and sizes of the other sections within the file FIG. 502b. The size can be the number of entries or bytes, dependent on whether fixed structs are being written. The MetaData Section may also be referred to as the GCORE header section. FIG. 5A depicts a GCORE MetaData section 502 defined in a program code example using C constructs.

Environment Section

In FIG. 5C, the Environment Section 504 entries provide information about the GCORE generation environment, including information about the operating system, the compiler, and the processor. This information may come from the core, the executable, or it may be user defined. A corresponding example program code description of environment section 504 is defined using C constructs.

Files Section

In FIG. 5D, the Files section 506 entries provide information about the files that form the input for the GCORE and information pertaining to that file. This may include information about the core, the executable, and various header files included for analysis. A corresponding example program code description defines files section 506 using C constructs.

String Table Section

In FIG. 5E, the String Table section 508 entries provide information about the various strings of the GCORE file. String table sections hold null-terminated character sequences, commonly called strings. The object file uses these strings to represent symbol and section names. A corresponding example program code description defines string table section 508 using C constructs.

Local Symbol Table Section

In FIG. 5F, the Local Symbol Table section 510 entries provide information about the local symbols. A local symbol table stores all symbols and their attributes. The local symbol table contains a list of all local identifier names as well as the String value of the object being referenced. During parsing, symbol identifier information is located by searching first a local symbol table, and then a global symbol table. If symbol identifier information is not found, that identifier is considered a local variable and it is inserted into the local symbol table. A corresponding example program code description defines local symbol table section 510 using C constructs.

Symbol Table Section

In FIG. 5G, the Symbol Table section 512 entries provide information about the symbol declarations of a program. A symbol table holds information needed to locate and relocate the program's symbolic definitions and references. When an operating system core is converted into a GCORE format, the converted file initially contains only information about the global symbols, which are found in the executable file. The GCORE file can be extended through addition of new symbols as well as the types description of existing symbols extracted from source files. A corresponding example program code description defines symbol table section 512 using C constructs.

Symbol Info Section

In FIG. 5H, an entry in the Symbol Info Section 514 describes the types of information for a symbol as interpreted from the declaration in program code. A corresponding example program code description defines symbol info section 514 using C constructs.

Stack Section

In FIG. 5I, the Stack Section 518 entries describe information about the various functions that were called at the time a core dump occurred, including local variables, addresses, pointers, parameters, list offsets, parameter list offsets. The Stack Section contains the information about each function in the stack and the values of the function parameters. The Stack Section is extracted from the operating system core file. A corresponding example program code description defines Stack Section 518 using C constructs.

Lines Section

In FIG. 5J, the Lines section 520 entries describe information about the line number of the code in the executable file. The information about this section comes from the executable file if it is available. A corresponding example program code description defines Lines Section 520 using C constructs.

Types Section

In FIG. 5K, the Types section 522 describes all of the basic types defined in the code. When the operating system core is converted into a GCORE, the basic types and size information for the original platform is added to this section. When the GCORE is analyzed, header file information is included in the GCORE. User-defined types in the code are also included in the GCORE. A corresponding example program code description defines Types Section 522 using C constructs.

Types info Section

In FIG. 5L, the Types info section 524 entries provide header file information. Only the complex types, for example, depicted in 524a, like structure and functions use the Types info section 524. The Types info section also contains the members 524b of these complex types. Each member points to an entry in the Symbol Info section 514. A corresponding example types info section 524 program code is defined using C constructs.

Data Section

In FIG. 5M, the Data section 526 provides a list of entries, which contain offsets 526a corresponding to various virtual address ranges of the data segments 526a in the original core file. A corresponding example program code description of data section 526 is defined using C constructs.

Text Section

In FIG. 5N, the Text section 528 entries provide a list of entries, which specify the offsets 528b corresponding to various virtual address ranges 528a of the text segments in the original executable file. A corresponding example program code description depicts an example of a GCORE Text Section 528 defined using C constructs.

G/XML: GCORE Defined Using an XML Schema

According to an embodiment, the GCORE may be represented in an extensible data format. An XML schema has been utilized to define GCORE, referred to as G/XML for further reference in this application. A benefit of representing GCORE using an XML schema is that G/XML does away with much of the metadata, therefore machine level information about an executable is easier to access.

Definition of types and declaration of tags can be accomplished easily using an XML schema. Types may be extended to derive newer types, including derivation of newer types in other schemas. General characteristics of XML provide benefits for the representation of GCORE in an extensible data format. XML schemas support namespaces that help in schema extension. XML schemas are XML documents, and are therefore programmatically accessible. Logic may be built around the "grammar" of the language described through the schema. Schemas provide XML extensibility. Because schemas may be used to derive another schema, reuse and modularity of design are possible.

Overview of the G/XML Schema Design

One of the basic recommendations for schema design is that the design should be concise and quick to develop. However, schemas have a drawback of being far more "inflated" representations as compared to DTDs. For this reason, it makes sense to define a hierarchy within the design of schemas and derive one level from the previous, and keep each level relatively uncluttered.

GCORE File Schema

In FIG. 5Y, the GCORE XML file schema 540 defines the different elements, which are of types described in FIGS. 5O-5X defined in G/XML. According to an embodiment, one approach is to create types and attribute groups at the lowest level and use them in higher-level types and elements. The types defined in the G/XML benefit from the global openness property of an extensible data format, such as an XML schema. The defined schemas comprise the various types of entities that exist in GCORE.

G/XML

According to an embodiment, G/XML has been broken up into the following entities for which there are corresponding types in the schema. Most types are defined based upon the sample XML schema which is provided. Type definitions that benefit from description include further explanation. According to an embodiment, types defined in FIGS. 5O-5X corresponding to GCORE sections as illustrated in FIG. 5A are defined using an XML schema FIG. 540, and are referenced accordingly. According to an embodiment of the present invention, types that are needed by different elements of GCORE are defined as follows:

The HeaderType

In FIG. 5O thru FIG. 5P, the HeaderType 542A, 542B defines tags which provide information about metadata as described corresponding to Metadata Section 502 of GCORE file 206. The HeaderType section defines the offset of each section and its size.

The EnvInfoType

In FIG. 5Q, the EnvInfoType 544 defines tags, which contain environment information as described in Environment Section 504 of GCORE 206. Information such as information about the computing system, processor type, and operating system version are included in EvnInfoType 544.

The FileInfoType

In FIG. 5R, the FileInfoType 546 defines tags, which contain file specific information as described in File Section 506 of GCORE 206. Information such as name and type information is described in FileInfoType.

The SymTableType

In FIG. 5S, the SymTableType 548 defines tags which contain symbol specific information as described in Symbol Table Section 512 of the GCORE. Information such as name value and type is provided in SymTableType.

The SymInfoType

In FIG. 5T, the SymInfoType 550 defines symbol information as described in Symbol Info Section 514 of the GCORE.

The StackType

In FIG. 5U, the StackType 552 defines information about stack entries as described in StackSection 518 in the GCORE.

The LineType

In FIG. 5V, the LineType 554 defines type information defined for line as described in the Lines Section 520 of GCORE.

The DataType

In FIG. 5W, the DataType 556 type definition is as described in Data Section 526. Information, such as type name, type sizes, member information and member offset are provided in Data Type 556.

The Section Type

In FIG. 5X, the Section Type 558 defines tags which contain data and text specific information. The section type includes an attribute to distinguish between data as provided in Data Section 526 and Text Section 528 of GCORE 206.

As described in the aforementioned sections, the GCORE file facilitates analysis by a developer of problems leading to a computer system crash in a platform independent manner. As described, the GCORE file format can be read and analyzed independent of operating system platform, operating system version and machine architecture. Representing core files in a generic format facilitates analysis of such files overcomes the operating system platform and operating system platform version specific limitations of conventional core file analysis techniques. Representation of core files in a generic format facilitates analysis of such files regardless of operating system version, operating system platform and machine architecture. Representation of core files in a generic format may assist analysts in determining errors in code that the operating system is unable to handle. According to another aspect, techniques are provided for representation of core files in an extensible data format.

Hardware Overview

The approach for representation of core files in a generic format described herein may be implemented in a variety of ways and the invention is not limited to any particular implementation. The approach may be implemented as a stand-alone mechanism. Furthermore, the approach may be implemented in computer software, hardware, or a combination thereof.

Figure 6:
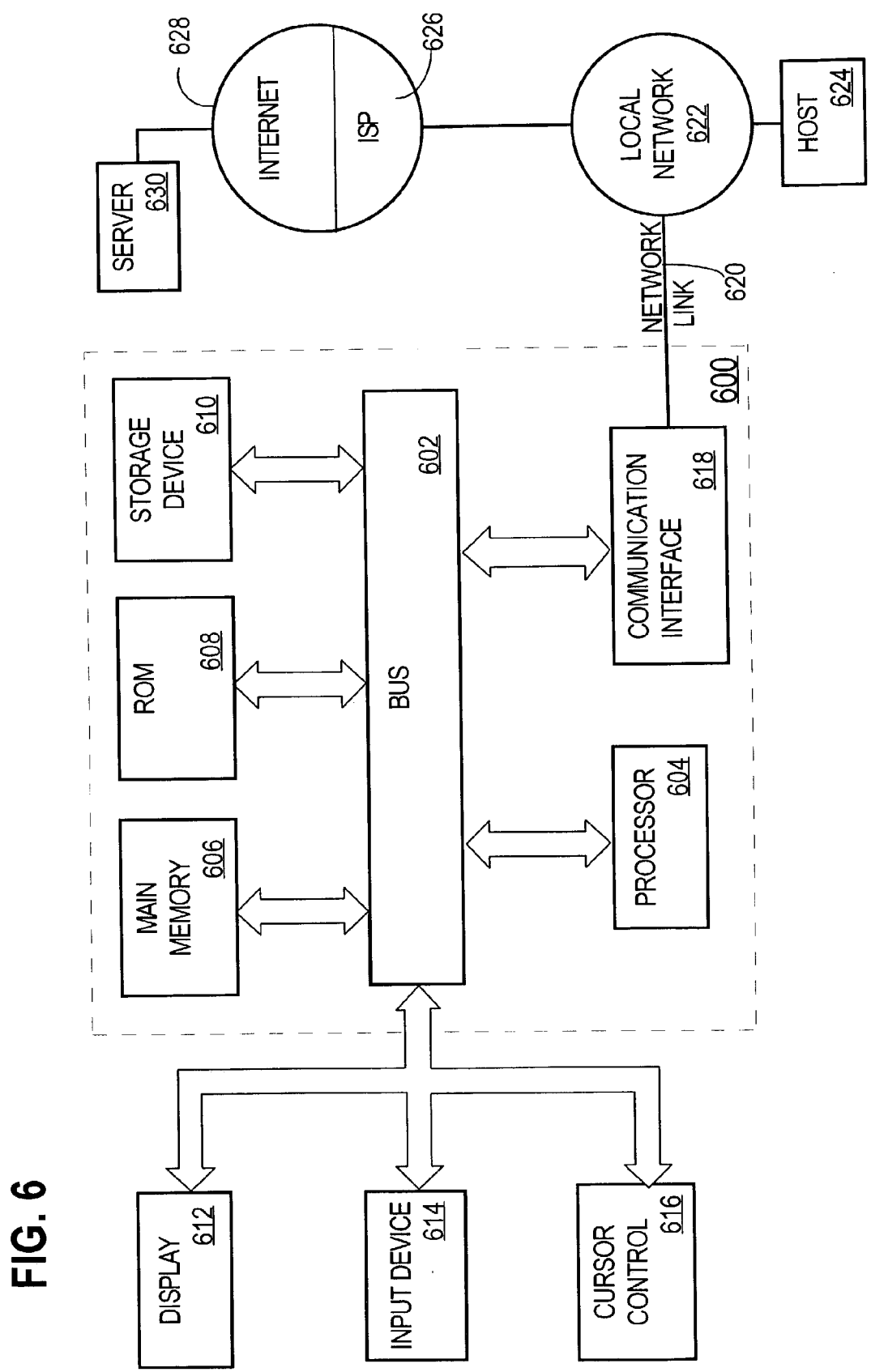

FIG. 6 is a block diagram that depicts a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

Extensions and Alternatives

In the foregoing specification, the invention has been described with reference to specific embodiments thereof. It will, however, be evident that various modifications and changes may be made thereto without departing from the broader spirit and scope of the invention. Thus, the specification and drawings are, accordingly, to be regarded in an illustrative rather than a restrictive sense. The invention includes other contexts and applications in which the mechanisms and processes described herein are available to other mechanisms, methods, programs, and processes.

In addition, in this disclosure, certain process steps are set forth in a particular order, and alphabetic and alphanumeric labels are used to identify certain steps. Unless specifically stated in the disclosure, embodiments of the invention are not limited to any particular order of carrying out such steps. In particular, the labels are used merely for convenient identification of steps, and are not intended to imply, specify or require a particular order of carrying out such steps. Furthermore, other embodiments may use more or fewer steps than those discussed herein.

What is claimed is:

1. A computer-implemented method, comprising:
   detecting that an error in executing a program has occurred on a machine having a first platform;
   in response to said error, obtaining a core dump file at said first platform, wherein said core dump file identifies a state of data stored in volatile memory of said machine at the time said error is detected, wherein said core dump file is readable by said first platform; and
   transforming said core dump file into a generic core dump file, wherein said generic core dump file is usable by a second platform, which is a different type of platform than said first platform, to identify the state of data stored in said volatile memory of said machine at the time said error was detected.

2. The method of claim 1, the method further comprising the step of:
   storing said generic core dump file as an extensible markup language (XML) document.

3. The method of claim 1, wherein said generic core dump file is readable by two or more platforms.

4. The method of claim 1, wherein transforming said core dump file comprises:
   reconstructing symbol information for the program; and
   combining said reconstructed symbol information with compile time information for the program and run time information for the program to form said generic core dump file.

5. The method of claim 1, wherein said first platform includes a first operating system, wherein said second platform includes a second operating system, and wherein said first operating system is different than said second operating system.

6. The method of claim 1, wherein said first platform includes a first machine architecture, wherein said second platform includes a second machine architecture, and wherein said first machine architecture is different than said second machine architecture.

7. The method of claim 1, wherein the generic core dump file includes a superset of binary formats used within UNIX comprising of Executable and Linking Format (ELF), Common Object File Format (COFF), Programmable Instruction Set Computers Format (PRISC) and Mobilization Stationing, Planning, and Execution System Format (MSPES).

8. The method of claim 4, wherein compile time information comprises a global symbol table and text segment machine level instruction extracted from an executable file.

9. The method of claim 4, wherein run time information comprises stack and data segment information extracted from said core dump file from the operating system.

10. The method of claim 4, wherein symbol information is extracted from one or more source files.

11. The method of claim 1, wherein said generic core dump file is defined by C structures.

12. A computer-readable volatile or non-volatile medium carrying one or more sequences of instructions, wherein execution of the one or more sequences of instructions by one or more processors causes the one or more processors to perform the steps of:
   detecting that an error in executing a program has occurred on a machine having a first platform;
   in response to said error, obtaining a core dump file, wherein said core dump file identifies a state of data stored in volatile memory of said machine at the time said error is detected, wherein said core dump file is readable by said first platform; and
   transforming said core dump file into a generic core dump file, wherein said generic core dump file is readable by a second platform that is different than said first platform.

13. The computer-readable volatile or non-volatile medium of claim 12 further comprising the step of:
   storing said generic format core file as an extensible markup language (XML) document.

14. The computer-readable volatile or non-volatile medium of claim 12, wherein said generic core dump file is readable by two or more platforms.

15. The computer-readable volatile or non-volatile medium of claim 12, wherein transforming said core dump file comprises:
   reconstructing symbol information for the program; and
   combining said reconstructed symbol information with compile time information for the program and run time information for the program to form said generic core dump file.

16. The computer-readable volatile or non-volatile medium of claim 12, wherein said first platform includes a first operating system, wherein said second platform includes a second operating system, and wherein said first operating system is different than said second operating system.

17. The computer-readable volatile or non-volatile medium of claim 12, wherein said first platform includes a first machine architecture, wherein said second platform includes a second machine architecture, and wherein said first machine architecture is different than said second machine architecture.

18. The computer-readable volatile or non-volatile medium of claim 12, wherein the generic core dump file includes a superset of binary formats used within UNIX comprising of Executable and Linking Format (ELF), Common Object File Format (COFF), Programmable Instruction Set Computers Format (PRISC) and Mobilization Stationing, Planning, and Execution System Format (MSPES).

19. The computer-readable volatile or non-volatile medium of claim 15, wherein compile time information comprises a global symbol table and text segment machine level instruction extracted from an executable file.

20. The computer-readable volatile or non-volatile medium of claim 15, wherein run time information comprises stack and data segment information extracted from said core dump file from the operating system.

21. The computer-readable volatile or non-volatile medium of claim 15, wherein symbol information is extracted from one or more source files.

22. The computer-readable volatile or non-volatile medium of claim 12, wherein said generic core dump file is defined by C structures.

23. A computer system comprising:
   a processor; and a memory coupled to the processor, the memory containing one or more sequences of instructions, wherein execution of the one or more sequences of instructions by the processor causes the processor to perform the steps of:
   detecting that an error in executing a program has occurred on a machine having a first platform;
   in response to said error, obtaining a core dump file at said first platform, wherein said core dump file identifies a state of data stored in volatile memory of said machine at the time said error is detected, wherein said core dump file is readable by said first platform; and
   transforming said core dump file into a generic core dump file, wherein said generic core dump file is usable by a second platform, which is a different type of platform than said first platform, to identify the state of data stored in said volatile memory of said machine at the time said error was detected.

24. The computer system of claim 23, wherein the memory having stored instructions of the computer system causing the processor to perform the computer-implemented steps further comprising the computer-implemented step of:
   storing said generic format core file as an extensible markup language (XML) document.

25. The computer system of claim 23, wherein said generic core dump file is readable by two or more platforms.

26. The computer system of claim 23, wherein transforming said core dump file comprises:
   reconstructing symbol information for the program; and
   combining said reconstructed symbol information with compile time information for the program and run time information for the program to form said generic core dump file.

27. The computer system of claim 23, wherein said first platform includes a first operating system, wherein said second platform includes a second operating system, and wherein said first operating system is different than said second operating system.

28. The computer system of claim 23, wherein said first platform includes a first machine architecture, wherein said second platform includes a second machine architecture, and wherein said first machine architecture is different than said second machine architecture.

29. The computer system of claim 23, wherein the generic core dump file includes a superset of binary formats used within UNIX comprising of Executable and Linking Format (ELF), Common Object File Format (COFF), Programmable Instruction Set Computers Format (PRISC) and Mobilization Stationing, Planning, and Execution System Format (MSPES).

30. The computer system of claim 26, wherein compile time information comprises a global symbol table and text segment machine level instruction extracted from an executable file.

31. The computer system of claim 26, wherein run time information comprises stack and data segment information extracted from said core dump file from the operating system.

32. The computer system of claim 26, wherein symbol information is extracted from one or more source files.

33. The computer system of claim 23, wherein said generic core dump file is defined by C structures.

* * * * *